United States Patent
Resch et al.

(10) Patent No.: US 12,032,442 B2
(45) Date of Patent: *Jul. 9, 2024

(54) AGGREGATING AUDIT RECORDS IN A STORAGE NETWORK

(71) Applicant: Pure Storage, Inc., Mountain View, CA (US)

(72) Inventors: Jason K. Resch, Warwick, RI (US); Wesley B. Leggette, Chicago, IL (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,986

(22) Filed: Nov. 28, 2022

(65) Prior Publication Data

US 2023/0112771 A1    Apr. 13, 2023

Related U.S. Application Data

(60) Continuation of application No. 16/985,400, filed on Aug. 5, 2020, now Pat. No. 11,537,470, which is a
(Continued)

(51) Int. Cl.
*G06F 11/10* (2006.01)
*G06F 3/06* (2006.01)
(Continued)

(52) U.S. Cl.
CPC ............ *G06F 11/1076* (2013.01); *G06F 3/06* (2013.01); *G06F 3/0604* (2013.01); *G06F 3/0619* (2013.01); *G06F 3/064* (2013.01); *G06F 3/067* (2013.01); *G06F 11/00* (2013.01); *G06F 11/1612* (2013.01); *G06F 15/17331* (2013.01); *G06F 21/6272* (2013.01); *G06F 21/64* (2013.01); *H04L 9/085* (2013.01);
(Continued)

(58) Field of Classification Search
None
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay |

(Continued)

OTHER PUBLICATIONS

Chung; an Automatic Data Segmentation Method for 3D Measured Data Points; National Taiwan University, pp. 1-8; 1998.
(Continued)

*Primary Examiner* — Brandon Hoffman
(74) *Attorney, Agent, or Firm* — Garlick & Markison; Bruce E. Stuckman; Katherine C. Stuckman

(57) ABSTRACT

A method includes obtaining audit records. Each of the audit records indicates a timestamp for a corresponding message, at least one event type code selected from a plurality of event type codes for a corresponding audit event of the corresponding message, and an identifier for a corresponding system entity associated with creation of the corresponding message. A number of audit records are aggregated over a period of time. An audit file is generated to include the number of audit records and integrity information. Storage of the audit file is facilitated by utilizing a name of the audit file.

20 Claims, 6 Drawing Sheets

Related U.S. Application Data continuation of application No. 16/860,222, filed on Apr. 28, 2020, now Pat. No. 11,243,839, which is a continuation of application No. 16/050,920, filed on Jul. 31, 2018, now Pat. No. 10,656,997, which is a continuation of application No. 15/217,585, filed on Jul. 22, 2016, now Pat. No. 10,120,756, which is a continuation-in-part of application No. 14/954,527, filed on Nov. 30, 2015, now Pat. No. 9,992,019, which is a division of application No. 13/587,277, filed on Aug. 16, 2012, now Pat. No. 9,229,823.

(60) Provisional application No. 61/524,521, filed on Aug. 17, 2011.

(51) Int. Cl.
| | |
|---|---|
| G06F 11/00 | (2006.01) |
| G06F 11/16 | (2006.01) |
| G06F 15/173 | (2006.01) |
| G06F 21/62 | (2013.01) |
| G06F 21/64 | (2013.01) |
| H04L 9/08 | (2006.01) |
| H04L 9/32 | (2006.01) |
| H04L 9/40 | (2022.01) |
| G06F 11/14 | (2006.01) |
| H04L 9/00 | (2022.01) |
| H04L 67/1097 | (2022.01) |

(52) U.S. Cl.
CPC .......... *H04L 9/0863* (2013.01); *H04L 9/0869* (2013.01); *H04L 9/0877* (2013.01); *H04L 9/0894* (2013.01); *H04L 9/32* (2013.01); *H04L 9/321* (2013.01); *H04L 9/3263* (2013.01); *H04L 63/123* (2013.01); *G06F 11/1446* (2013.01); *G06F 2211/1028* (2013.01); *H04L 9/00* (2013.01); *H04L 67/1097* (2013.01); *H04L 2209/16* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers |
| 5,802,364 | A | 9/1998 | Senator |
| 5,809,285 | A | 9/1998 | Hilland |
| 5,890,156 | A | 3/1999 | Rekieta |
| 5,987,622 | A | 11/1999 | Lo Verso |
| 5,991,414 | A | 11/1999 | Garay |
| 6,012,159 | A | 1/2000 | Fischer |
| 6,058,454 | A | 5/2000 | Gerlach |
| 6,128,277 | A | 10/2000 | Bruck |
| 6,175,571 | B1 | 1/2001 | Haddock |
| 6,192,472 | B1 | 2/2001 | Garay |
| 6,256,688 | B1 | 7/2001 | Suetaka |
| 6,272,658 | B1 | 8/2001 | Steele |
| 6,301,604 | B1 | 10/2001 | Nojima |
| 6,356,949 | B1 | 3/2002 | Katsandres |
| 6,366,995 | B1 | 4/2002 | Vilkov |
| 6,374,336 | B1 | 4/2002 | Peters |
| 6,415,373 | B1 | 7/2002 | Peters |
| 6,418,539 | B1 | 7/2002 | Walker |
| 6,449,688 | B1 | 9/2002 | Peters |
| 6,567,948 | B2 | 5/2003 | Steele |
| 6,571,282 | B1 | 5/2003 | Bowman-Amuah |
| 6,609,223 | B1 | 8/2003 | Wolfgang |
| 6,718,361 | B1 | 4/2004 | Basani |
| 6,760,808 | B2 | 7/2004 | Peters |
| 6,785,768 | B2 | 8/2004 | Peters |
| 6,785,783 | B2 | 8/2004 | Buckland |
| 6,826,711 | B2 | 11/2004 | Moulton |
| 6,879,596 | B1 | 4/2005 | Dooply |
| 7,003,688 | B1 | 2/2006 | Pittelkow |
| 7,024,451 | B2 | 4/2006 | Jorgenson |
| 7,024,609 | B2 | 4/2006 | Wolfgang |
| 7,080,101 | B1 | 7/2006 | Watson |
| 7,103,824 | B2 | 9/2006 | Halford |
| 7,103,915 | B2 | 9/2006 | Redlich |
| 7,111,115 | B2 | 9/2006 | Peters |
| 7,140,044 | B2 | 11/2006 | Redlich |
| 7,146,644 | B2 | 12/2006 | Redlich |
| 7,171,493 | B2 | 1/2007 | Shu |
| 7,222,133 | B1 | 5/2007 | Raipurkar |
| 7,240,236 | B2 | 7/2007 | Cutts |
| 7,272,613 | B2 | 9/2007 | Sim |
| 7,636,724 | B2 | 12/2009 | De La Torre |
| 2002/0062422 | A1 | 5/2002 | Butterworth |
| 2002/0166079 | A1 | 11/2002 | Ulrich |
| 2003/0018927 | A1 | 1/2003 | Gadir |
| 2003/0037261 | A1 | 2/2003 | Meffert |
| 2003/0065617 | A1 | 4/2003 | Watkins |
| 2003/0084020 | A1 | 5/2003 | Shu |
| 2004/0024963 | A1 | 2/2004 | Talagala |
| 2004/0122917 | A1 | 6/2004 | Menon |
| 2004/0215998 | A1 | 10/2004 | Buxton |
| 2004/0228493 | A1 | 11/2004 | Ma |
| 2005/0100022 | A1 | 5/2005 | Ramprashad |
| 2005/0114594 | A1 | 5/2005 | Corbett |
| 2005/0125593 | A1 | 6/2005 | Karpoff |
| 2005/0131993 | A1 | 6/2005 | Fatula, Jr. |
| 2005/0132070 | A1 | 6/2005 | Redlich |
| 2005/0144382 | A1 | 6/2005 | Schmisseur |
| 2005/0229069 | A1 | 10/2005 | Hassner |
| 2006/0047907 | A1 | 3/2006 | Shiga |
| 2006/0136448 | A1 | 6/2006 | Cialini |
| 2006/0156059 | A1 | 7/2006 | Kitamura |
| 2006/0224603 | A1 | 10/2006 | Correll, Jr. |
| 2007/0079081 | A1 | 4/2007 | Gladwin |
| 2007/0079082 | A1 | 4/2007 | Gladwin |
| 2007/0079083 | A1 | 4/2007 | Gladwin |
| 2007/0088970 | A1 | 4/2007 | Buxton |
| 2007/0174192 | A1 | 7/2007 | Gladwin |
| 2007/0214285 | A1 | 9/2007 | Au |
| 2007/0234110 | A1 | 10/2007 | Soran |
| 2007/0283167 | A1 | 12/2007 | Venters, III |
| 2009/0094251 | A1 | 4/2009 | Gladwin |
| 2009/0094318 | A1 | 4/2009 | Gladwin |
| 2009/0288164 | A1* | 11/2009 | Adelstein .............. H04L 63/123 726/22 |
| 2010/0023524 | A1 | 1/2010 | Gladwin |
| 2010/0241595 | A1* | 9/2010 | Felsher .................. G16H 10/65 707/E17.014 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: an Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (ISCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): the Protocol; IETF Network Working Group; RFC 4511; Jun. 2006; pp. 1-68.

(56) References Cited

OTHER PUBLICATIONS

Shamir; How to Share a Secret; Communications of the ACM; vol. 22, No. 11; Nov. 1979; pp. 612-613.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

* cited by examiner

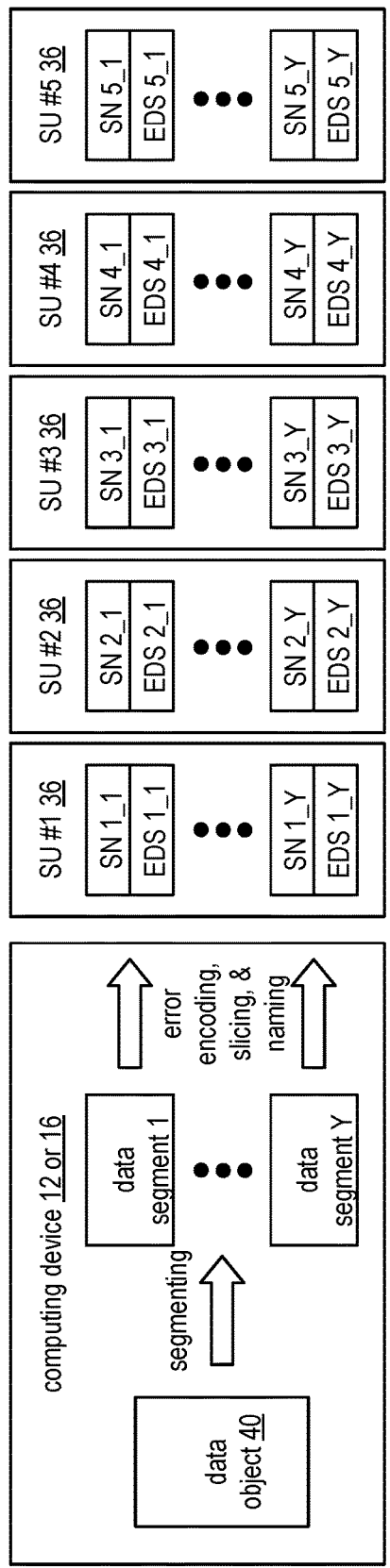
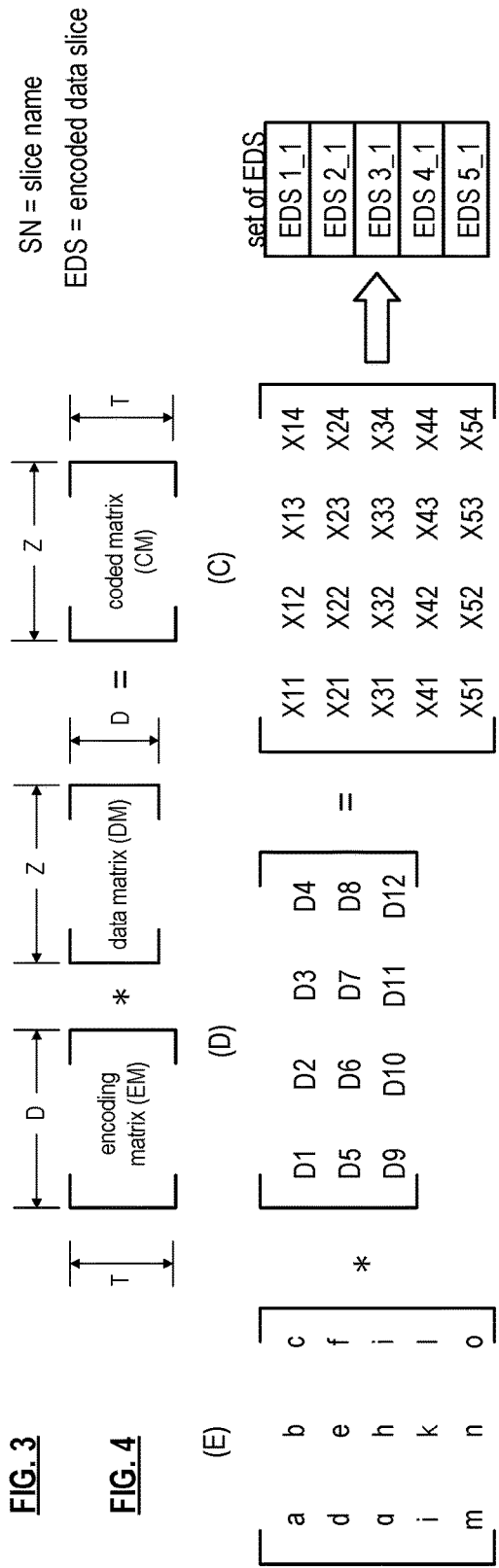
FIG. 3
FIG. 4
FIG. 5
FIG. 6

AGGREGATING AUDIT RECORDS IN A STORAGE NETWORK

CROSS REFERENCE TO RELATED PATENTS

The present U.S. Utility Patent Application claims priority pursuant to 35 U.S.C. § 120 as a continuation of U.S. Utility application Ser. No. 16/985,400, entitled "Audit Record Aggregation in a Storage Network", filed Aug. 5, 2020, issued as U.S. Pat. No. 11,537,470 on Dec. 27, 2022, which is a continuation of U.S. Utility application Ser. No. 16/860,222, entitled "Audit File Generation In A Dispersed Storage Network", filed Apr. 28, 2020, issued as U.S. Pat. No. 11,243,839 on Feb. 8, 2022, which is a continuation of U.S. Utility application Ser. No. 16/050,920, entitled "Audit Object Generation In A Dispersed Storage Network", filed Jul. 31, 2018, issued as U.S. Pat. No. 10,656,997 on May 19, 2020, which is a continuation of U.S. Utility application Ser. No. 15/217,585, entitled "Audit Object Generation In A Dispersed Storage Network", filed Jul. 22, 2016, issued as U.S. Pat. No. 10,120,756 on Nov. 6, 2018, which is a continuation-in-part of U.S. Utility application Ser. No. 14/954,527, entitled "Storage And Retrieval Of Dispersed Storage Network Access Information", filed Nov. 30, 2015, issued as U.S. Pat. No. 9,992,019 on Jun. 5, 2018, which is a divisional of U.S. patent Ser. No. 13/587,277, entitled "Storage and Retrieval Of Dispersed Storage Network Access Information", filed Aug. 16, 2012, issued as U.S. Pat. No. 9,229,823 on Jan. 5, 2016, which claims priority pursuant to 35 U.S.C. § 119(e) to U.S. Provisional Application No. 61/524,521, entitled "Distributed Authentication Token Device", filed Aug. 17, 2011, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
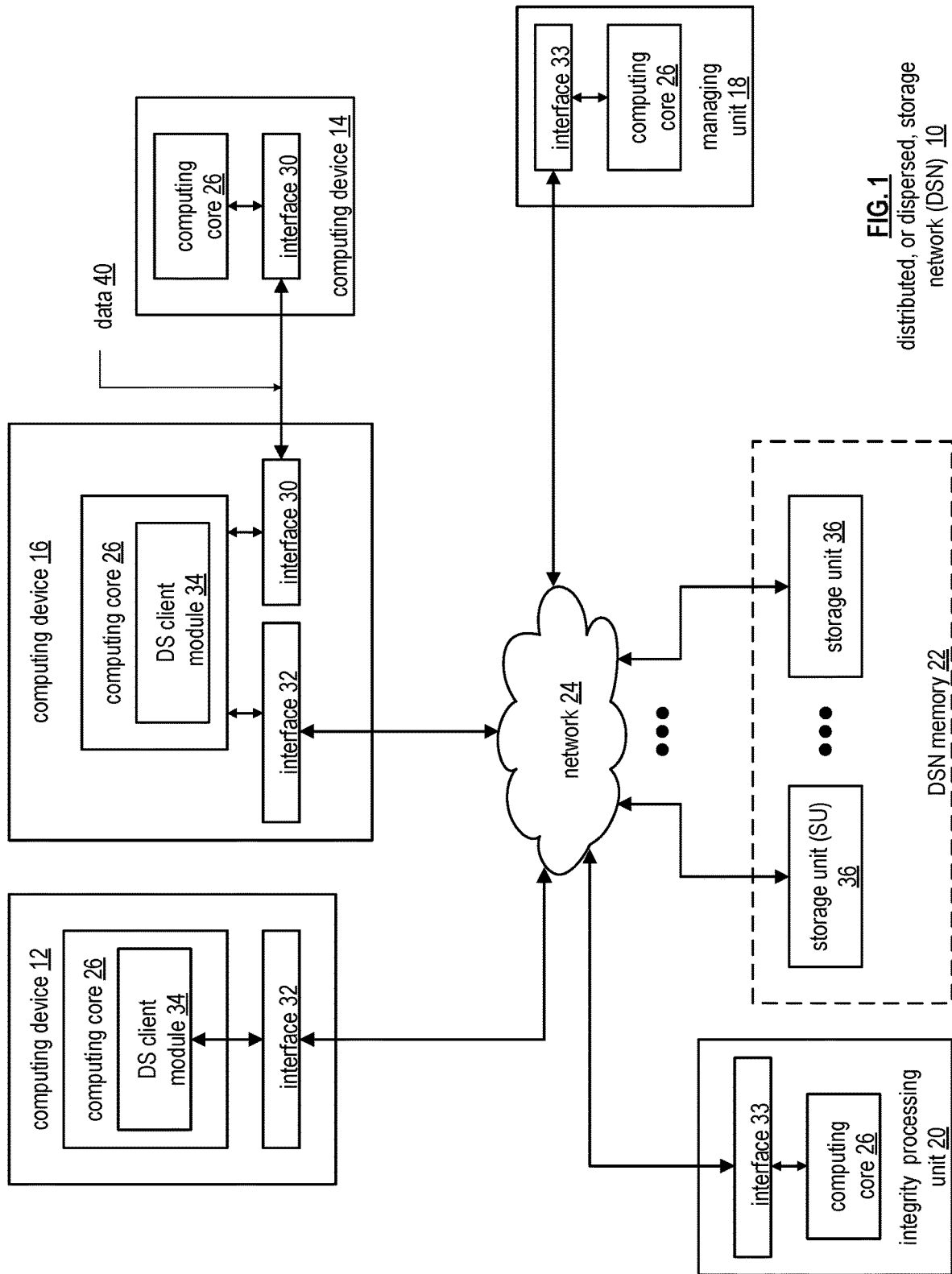
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
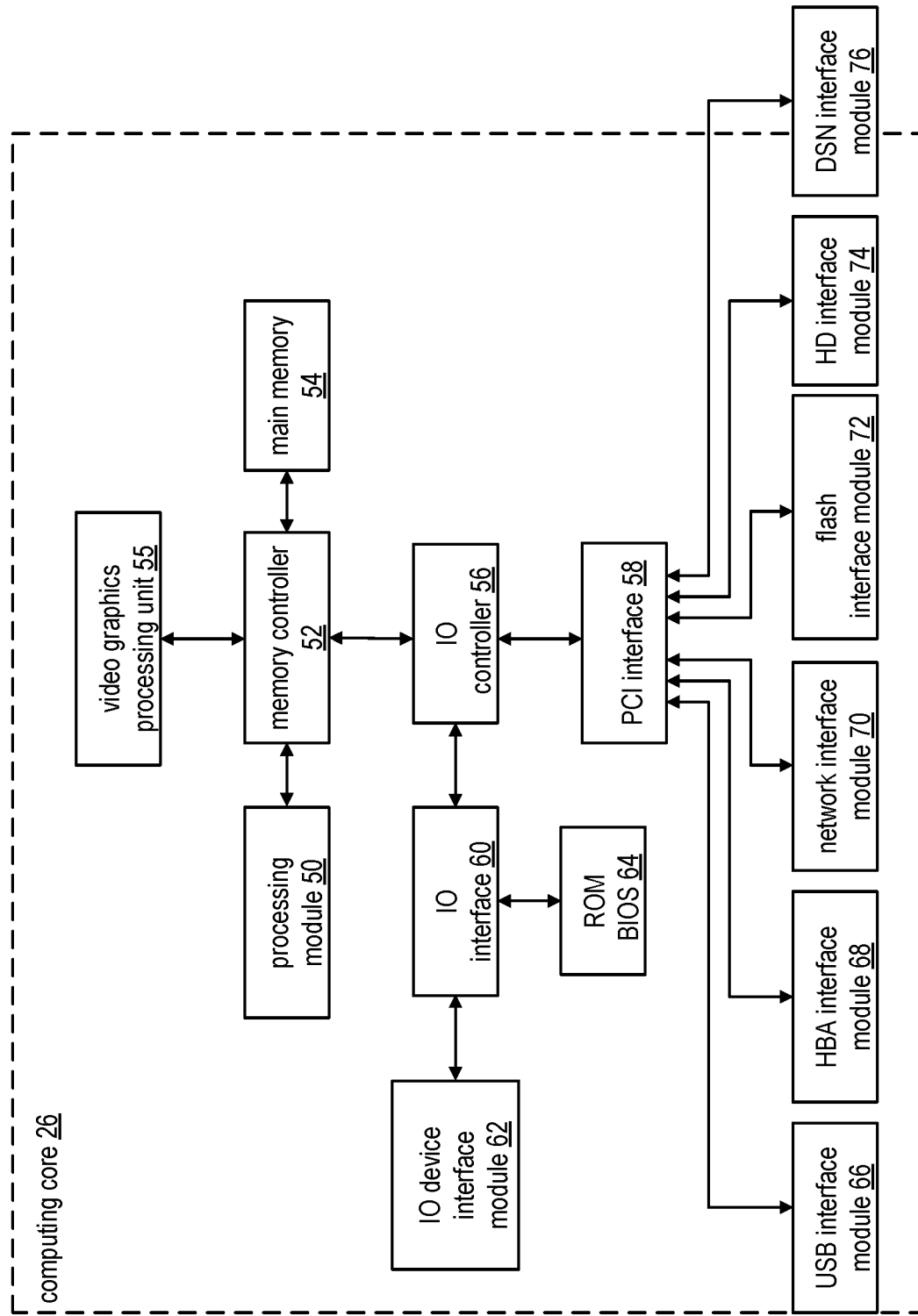
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a DST execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
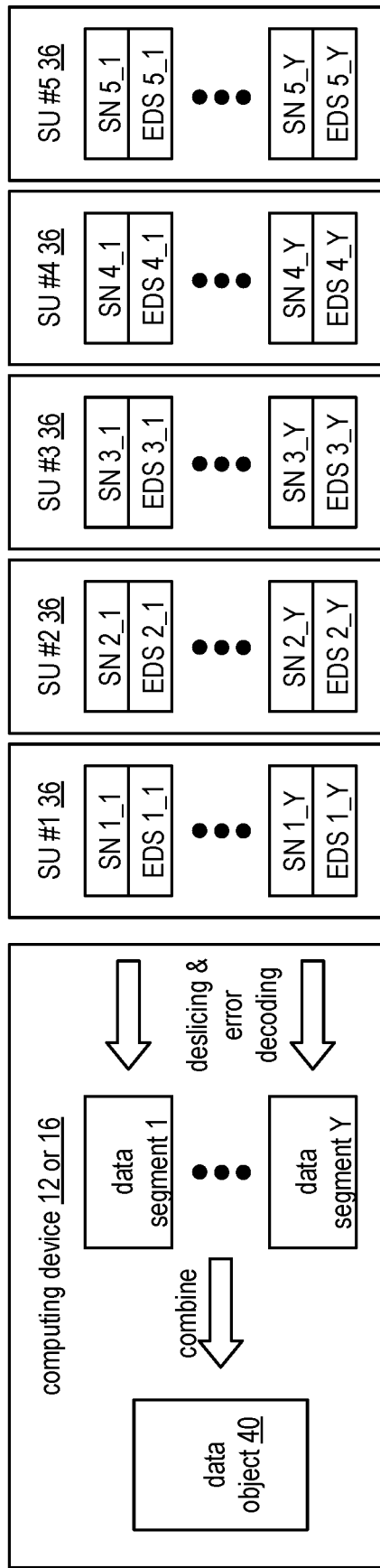
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
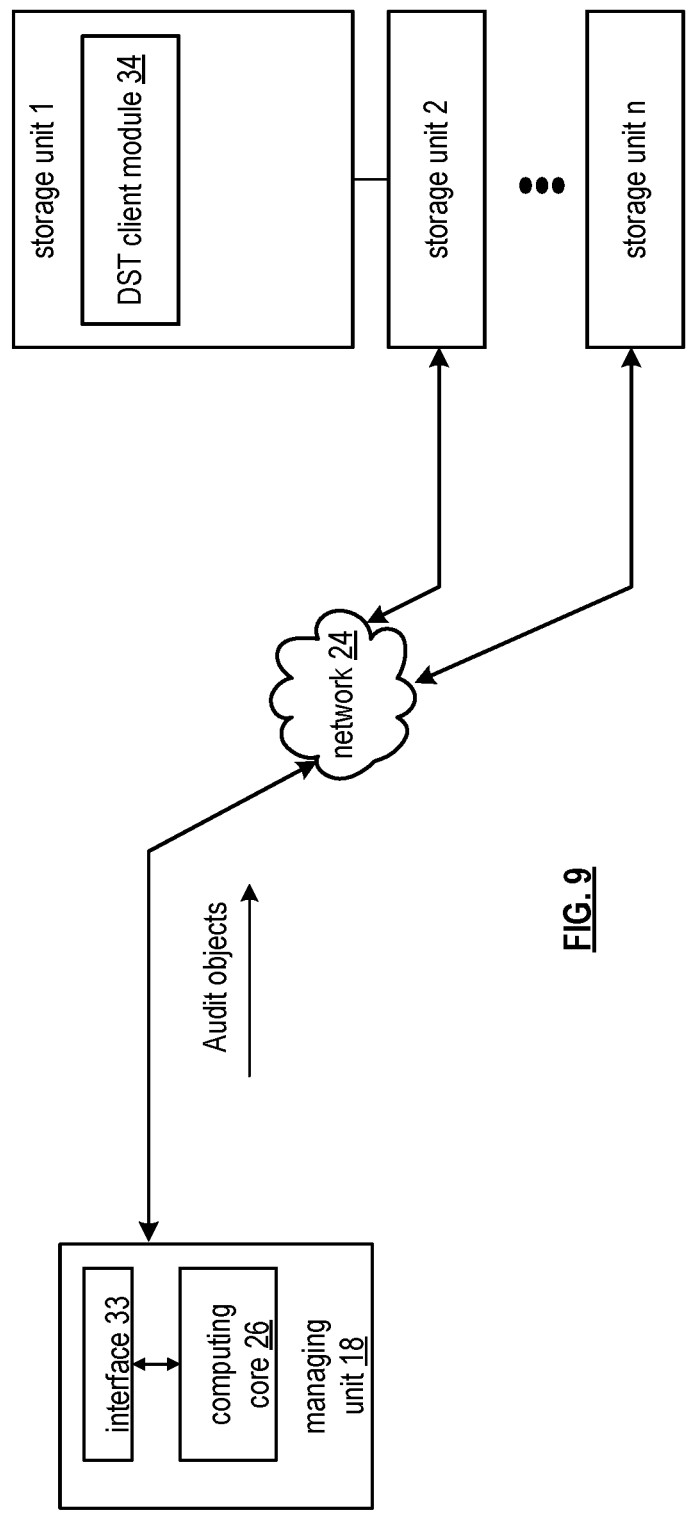
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes a managing unit 18 of FIG. 1, the network 24 of FIG. 1, and a plurality of storage units 1-n. The managing unit 18 can include the interface 33 of FIG. 1 and the computing core 26 of FIG. 1. The managing unit 18 may be referred to as a distributed storage and task (DST) processing unit. Each storage unit may be implemented utilizing the storage unit 36 of FIG. 1. The DSN functions to store a self-contained audit object in a vault of the DSN. In particular, the DST processing unit operates to obtain audit records for an audit object and determine when the audit object is complete. When the audit object is complete, the DST processing unit operates to aggregate the audit records of the audit object within the audit object by generating the audit object to include the audit records; generate identifier (ID) information; generate integrity information; populate fields of the audit object with the audit records, the ID information, and the integrity information; determine a name of the audit object; and facilitate storage of the audit object and the name of the audit object in a dispersed storage network (DSN).

In various embodiments, the name of the audit object is determined based on a virtual DSN address associated with accessing the audit object when stored as a plurality of audit object slices in the DSN. The name of the audit object can include a text string name, a sequence number, and/or a timestamp when created or a timestamp associated with when the audit object may be deleted. Determining when the audit object is complete can be based on comparing a number of audit records of the audit object to an audit record threshold. Generating the integrity information can include at least one of: utilizing an ID associated with the DST processing unit, querying another device of the DSN for the ID information or receiving the ID information. Generating the integrity information can include at least one of obtaining a certificate, generating a signature of the certificate, or calculating a hash of the audit object. Facilitating storage of the audit object and the name of the audit object can include at least one of: sending the audit object and the name of the audit object to the DSN for storage or storing the audit object and the name of the audit object in the DSN.

The further examples of audit object generation can be illustrated in conjunction with the following example. A self-contained audit object may contain one or more audit records. Each audit record consists of a time stamp, sequence number, type code, user identification and optionally a detail message. The timestamp can indicate the date and time the audit record was created. The sequence number can be a monotonically and consecutively increasing number, the type code is a machine understandable number indicating the type and meaning of the audit record, the user information indicates the identity of the user whose action caused the record to be produced and the detail message provides additional information related to the record itself. Each record answers the who, what, and when of the data object it corresponds to. In addition to the set of records, the self-contained audit object contains identity and integrity information. It answers the question of where the audit object originated from. This information consists of a device identifier, a certificate chain, and a digital signature. This allows the validity of origination for an audit object to be verified by a consumer of the self-contained audit object. It is typical that every unit making up a DSN aggregates records for some period of time, or until some size limit is reached. The unit will then aggregate the records into a self-contained audit object, apply device identity information and a digital signature, and send the object to a reliable and secure storage location. This location may be a vault on the DSN or other storage location. For simplified recovery of the most recent audit objects, these objects may be given a name which includes a date or sequence number, which allows the reader to request only the most recently produced audit objects. While the DST processing unit is described above in conjunction with the operation of managing unit 18, the audit objects may likewise be generated by other DST processing units, including integrity processing unit 20 and/or computing device 16 of FIG. 1.

Figure 10C:
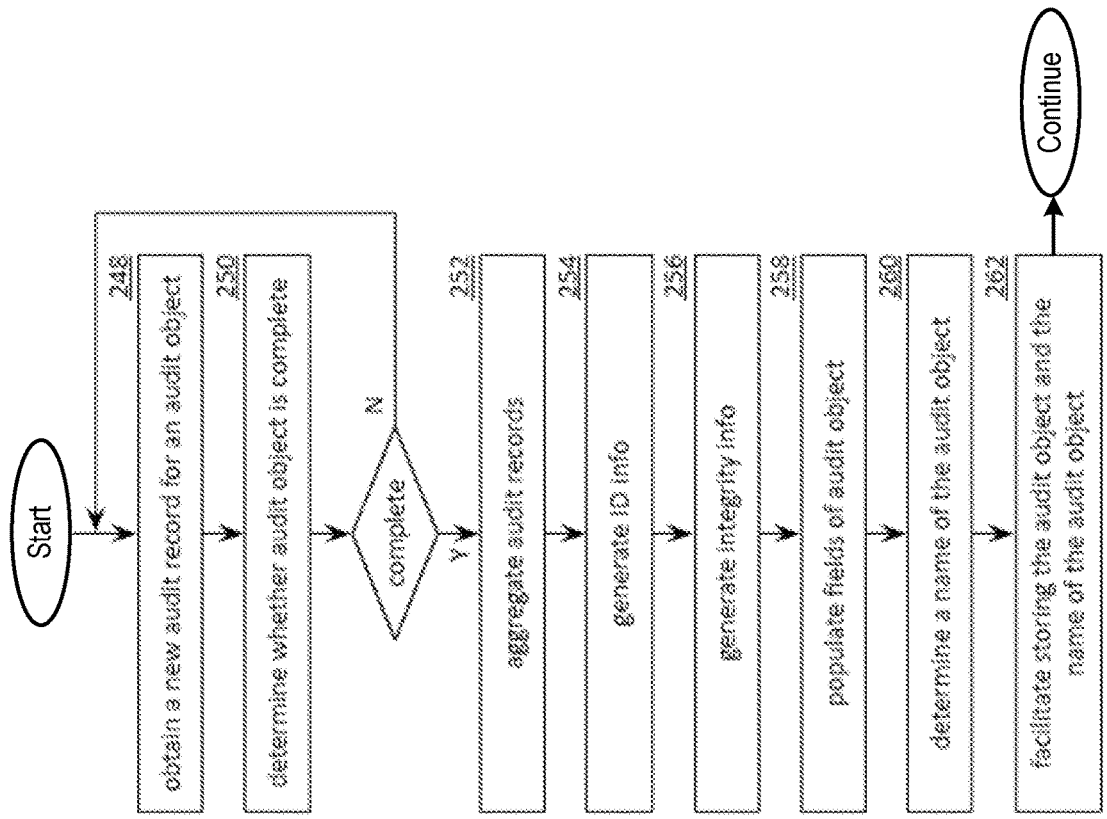
FIG. 10C is a flowchart illustrating an example of generating an audit object.
Figure 10A:
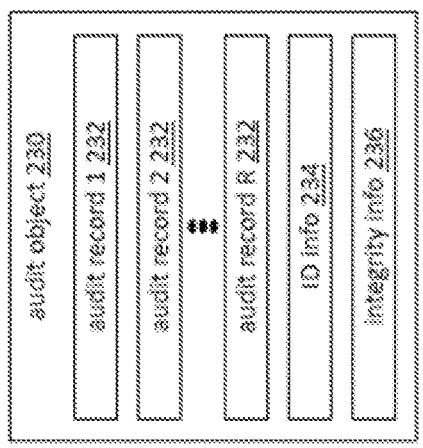
FIG. 10A is a diagram illustrating an example of an audit object 230 structure.

FIG. 10A is a diagram illustrating an example of an audit object 230 structure. The audit object 230 includes fields for a plurality of audit records 1-R 232, a field for identifier (ID) information 234, and a field for integrity information 236. Each audit record field 232 of the audit records 1-R 232 includes an audit record entry including information related to transactions within a dispersed storage network (DSN). Audit record content is discussed in greater detail with reference to FIG. 10B. The ID information field 234 includes an ID information entry including an originator ID associated with the audit object (e.g., an ID of an entity that created the audit object). The integrity information field 236 includes an integrity information entry including one or more of a device ID, a certificate chain, and a signature.

Figure 10B:
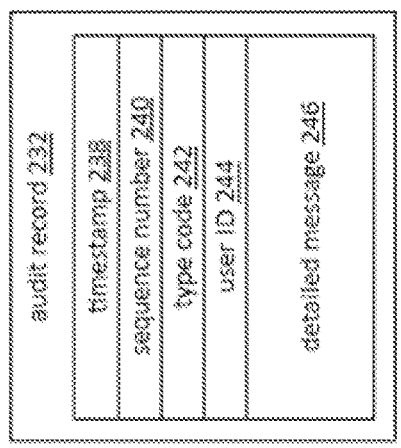
FIG. 10B is a diagram illustrating an example of an audit record 232 structure.

FIG. 10B is a diagram illustrating an example of an audit record 232 structure. The audit record 232 includes a timestamp field 238, a sequence number field 240, a type code field 242, a user identifier (ID) field 244, and a detailed message field 246. The timestamp field 238 includes a timestamp entry including a creation timestamp associated with a date and/or a time when the audit record 232 was created. The sequence number field 240 includes a sequence number entry including a unique monotonically increasing number associated with a transaction within a dispersed storage network (DSN). The type code field 242 includes a type code entry including record type indicator (e.g., a data access audit event or an authentication audit event). The user ID field 244 includes a user ID entry including an identifier of one or more principals (e.g., DSN system entities) associated with the audit record causing creation of the audit record. The detailed message field 246, when utilized, includes a detailed message entry including more information associated with the audit record 232 including an operation type (e.g., such as one of write, read, delete, login), a remote address (e.g., an Internet protocol address), a data object identifier, and a target vault ID.

FIG. 10C is a flowchart illustrating an example of generating an audit object. In particular, a method is presented for use in conjunction with one or more functions and features described in conjunction with FIGS. 1-9 is presented for execution by a dispersed storage and task (DST) processing unit that includes a processor or via another processing system of a dispersed storage network that includes at least one processor and memory that stores instruction that configure the processor or processors to perform the steps described below. In step 248, a processing module (e.g., a dispersed storage (DS) processing unit) obtains a new audit record for an audit object. The obtaining includes at least one of generating the new audit record and receiving the new audit record (e.g., from any device of a dispersed storage network (DSN) such as a DS unit). The method continues at step 250 where the processing module determines whether the audit object is complete. The determination may be based on comparing a number of audit records of the audit object to an audit record threshold. For example, the processing module determines that the audit object is complete when the number of audit records of the audit object is greater than the audit record threshold. The method loops back to step 248 when the processing module determines that the audit object is not complete. The method continues to step 252 when the processing module determines that the audit object is complete.

The method continues at step 252 where the processing module aggregates audit records of the audit object within the audit object by generating the audit object to include the audit records. The method continues at step 254 where the processing module generates identifier (ID) information. The generation includes at least one of utilizing an ID associated with the processing module (e.g., originator), querying another device for the ID information, and receiving the ID information. The method continues at step 256 where the processing module generates integrity information. The generation includes one or more of obtaining a certificate, generating a signature of the certificate, and calculating a hash of the audit object.

The method continues at step 258 where the processing module populates fields of the audit object with the audit records, the ID information, and the integrity information. The method continues at step 260 where the processing module determines a name of the audit object. A format of the name may be consistent with a virtual DSN address associated with accessing the audit object when stored as a plurality of audit object slices in the DSN and may include a text string name, a sequence number, a timestamp when created, and a timestamp associated with when the audit object may be deleted to enable a DS unit to autonomously delete a stored audit object when it is time to delete the audit object. The method continues at step 262 where the processing module facilitates storing the audit object and the name of the audit object. The facilitation includes at least one of storing the audit object and the name of the audit object and sending the audit object and the name of the audit object to the DSN for storage therein.

In various embodiments, a non-transitory computer readable storage medium includes at least one memory section that stores operational instructions that, when executed by a processing system of a dispersed storage network (DSN) that includes a processor and a memory, causes the processing system to obtain audit records for an audit object and determine when the audit object is complete. When the audit object is complete, the processing system operates to aggregate the audit records of the audit object within the audit object by generating the audit object to include the audit records; generate identifier (ID) information; generate integrity information; populate fields of the audit object with the audit records, the ID information, and the integrity information; determine a name of the audit object; and facilitate storage of the audit object and the name of the audit object in a dispersed storage network (DSN).

In various embodiments, the name of the audit object is determined based on a virtual DSN address associated with accessing the audit object when stored as a plurality of audit object slices in the DSN. The name of the audit object can include a text string name, a sequence number, and/or a timestamp when created or a timestamp associated with when the audit object may be deleted. Determining when the audit object is complete can be based on comparing a number of audit records of the audit object to an audit record threshold. Generating the integrity information can include at least one of: utilizing an ID associated with the DST processing unit, querying another device of the DSN for the ID information or receiving the ID information. Generating the integrity information can include at least one of obtaining a certificate, generating a signature of the certificate, or calculating a hash of the audit object. Facilitating storage of the audit object and the name of the audit object can include at least one of: sending the audit object and the name of the audit object to the DSN for storage or storing the audit object and the name of the audit object in the DSN.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
    obtaining audit records, wherein each of the audit records indicates: a timestamp for a corresponding message, at least one event type code selected from a plurality of event type codes for a corresponding audit event of the corresponding message, and an identifier for a corresponding system entity associated with creation of the corresponding message;
    aggregating a number of audit records over a period of time;
    generating an audit file to include the number of audit records and integrity information; and
    facilitating storage of the audit file by utilizing a name of the audit file.

2. The method of claim 1, wherein the name of the audit file is determined based on a virtual storage network address associated with accessing the audit file when stored as a plurality of audit file slices in a storage network.

3. The method of claim 1, wherein the name of the audit file further includes at least one of: a text string name or a sequence number.

4. The method of claim 1, wherein the name of the audit file further includes at least one of: a timestamp when created or a timestamp associated with when the audit file may be deleted.

5. The method of claim 1, wherein the integrity information is generated based on at least one of: utilizing an ID associated with a storage processing unit, querying another device of a storage network for ID information, or receiving the ID information.

6. The method of claim 1, wherein the integrity information is generated based on at least one of obtaining a certificate, generating a signature of the certificate, or calculating a hash of the audit file.

7. The method of claim 1, wherein facilitating storage of the audit file by utilizing the name of the audit file includes at least one of: sending the audit file and the name of the audit file to a storage network for storage, or storing the audit file and the name of the audit file in the storage network.

8. A processing system comprises:
    at least one processor;
    a memory that stores operational instructions that, when executed by the at least one processor, cause the processing system to perform operations that include:
        obtaining audit records, wherein each of the audit records indicates: a timestamp for a corresponding message, at least one event type code selected from a plurality of event type codes for a corresponding audit event of the corresponding message, and an identifier for a corresponding system entity associated with creation of the corresponding message;
        aggregating a number of audit records over a period of time;
        generating an audit file to include the number of audit records and integrity information; and
        facilitating storage of the audit file by utilizing a name of the audit file.

9. The processing system of claim 8, wherein the name of the audit file is determined based on a virtual storage network address associated with accessing the audit file when stored as a plurality of audit file slices in a storage network.

10. The processing system of claim 8, wherein the name of the audit file includes at least one of: a text string name or a sequence number.

11. The processing system of claim 8, wherein the name of the audit file includes at least one of: a timestamp when created or a timestamp associated with when the audit file may be deleted.

12. The processing system of claim 8, wherein the integrity information is generated based on at least one of: utilizing an ID associated with the processing system, querying another device for ID information, or receiving the ID information.

13. The processing system of claim 8, wherein the integrity information is generated based on at least one of obtaining a certificate, generating a signature of the certificate, or calculating a hash of the audit file.

14. The processing system of claim 8, wherein facilitating storage of the audit file utilizing the name of the audit file includes at least one of: sending the audit file and the name of the audit file to a storage network for storage, or storing the audit file and the name of the audit file in the storage network.

15. A non-transitory computer readable storage medium comprises:
    at least one memory section that stores operational instructions that, when executed by a processing system that includes a processor and a memory, causes the processing system to perform operations that include:
        obtaining audit records, wherein each of the audit records indicates: a timestamp for a corresponding message, at least one event type code selected from a plurality of event type codes for a corresponding audit event of the corresponding message, and an identifier for a corresponding system entity associated with creation of the corresponding message;
        aggregating a number of audit records over a period of time;
        generating an audit file to include the number of audit records and integrity information; and
        facilitating storage of the audit file by utilizing a name of the audit file.

16. The non-transitory computer readable storage medium of claim 15, wherein the name of the audit file is determined based on a virtual storage network address associated with accessing the audit file when stored as a plurality of audit file slices in a storage network.

17. The non-transitory computer readable storage medium of claim 15, wherein the name of the audit file includes at least one of: a text string name or a sequence number.

18. The non-transitory computer readable storage medium of claim 15, wherein the name of the audit file includes at least one of: a timestamp when created or a timestamp associated with when the audit file may be deleted.

19. The non-transitory computer readable storage medium of claim 15, wherein the integrity information is generated based on at least one of: utilizing an ID associated with the processing system, querying another device for ID information, or receiving the ID information.

20. The non-transitory computer readable storage medium of claim 15, wherein the integrity information is generated based on at least one of obtaining a certificate, generating a signature of the certificate, or calculating a hash of the audit file.

\* \* \* \* \*